United States Patent

Wu

(10) Patent No.: US 8,444,074 B2
(45) Date of Patent: May 21, 2013

(54) PEPPER MILL

(75) Inventor: Ming-Feng Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 666 days.

(21) Appl. No.: 12/651,967

(22) Filed: Jan. 4, 2010

(65) Prior Publication Data
US 2011/0162538 A1    Jul. 7, 2011

(51) Int. Cl.
*A01D 34/90*    (2006.01)

(52) U.S. Cl.
USPC .......................................... 241/169.1; 99/537

(58) Field of Classification Search
USPC ........................................................ 241/169.1
IPC .................................... A01D 34/90; A47J 42/00
See application file for complete search history.

(56) References Cited

U.S. PATENT DOCUMENTS

| | | | |
|---|---|---|---|
| 5,180,114 A * | 1/1993 | Chen ........................... | 241/169.1 |
| 7,059,553 B2 * | 6/2006 | Mueller .................... | 241/199.12 |
| 2005/0211806 A1 * | 9/2005 | Ng ............................... | 241/169.1 |
| 2006/0208115 A1 * | 9/2006 | Mueller ...................... | 241/169.1 |
| 2007/0221770 A1 * | 9/2007 | Cheng ......................... | 241/169.1 |
| 2008/0093489 A1 * | 4/2008 | Hadj-Chikh et al. ...... | 241/169.1 |
| 2009/0084878 A1 * | 4/2009 | Wang Wu ................... | 241/169.1 |
| 2009/0095832 A1 * | 4/2009 | Wu .............................. | 241/169.1 |

* cited by examiner

*Primary Examiner* — Gene Kim
*Assistant Examiner* — Matthew B Stanczak
(74) *Attorney, Agent, or Firm* — Faegre Baker Daniels LLP (57) ABSTRACT

A pepper mill includes a driving member coupled rotatably to a container body and cooperating with the container body to define a receiving space, a grinding unit, a planetary gear mechanism, and an adjusting component. The grinding unit includes a coupling shaft extending rotatably and being movable in the receiving space, a stationary first grinding seat, and a second grinding seat co-rotatable with the coupling shaft. The size of a grinding space between the first and second grinding seats is adjusted when the coupling shaft and the second grinding seat move axially relative to the first grinding seat. The planetary gear mechanism includes a driving gear unit and a driven gear unit driven rotatably by the driving gear unit to drive rotation of the coupling shaft. The adjusting component is connected threadedly to the coupling shaft and is operable to drive the axial movement of the coupling shaft and the second grinding seat.

8 Claims, 7 Drawing Sheets

FGI. 3

PEPPER MILL

BACKGROUND OF THE INVENTION

1. Field of the Invention

The invention relates to a grinder, more particularly to a pepper mill.

2. Description of the Related Art

A conventional pepper mill generally comprises a container body, a driving member coupled rotatably to a top end of the container body, and a grinding unit. The container body includes a surrounding wall that defines a receiving space therein for receiving peppercorns. The grinding unit includes a coupling shaft extending in the receiving space and coupled co-rotatably to the driving member, a rotatable grinding seat mounted co-rotatably to a bottom end of the coupling shaft, and a stationary grinding seat surrounding the rotatable grinding seat and cooperating with the rotatable grinding seat to define a grinding space therebetween. As such, when the driving member and the coupling shaft are rotated by 360 degrees, the rotatable grinding seat is also driven to rotate by 360 degrees relative to the stationary grinding seat so as to grind the peppercorns advanced into the grinding space. However, output torque of the coupling shaft cannot be increasingly adjusted to result in a more effort-saving grinding operation. Generally, the conventional pepper mill further comprises an adjusting mechanism that is operable to drive one of the rotatable and stationary grinding seats to move upwardly and downwardly relative to the other one of the rotatable and stationary grinding seats so as to change the size of the grinding space, thereby adjusting the size of ground pepper particles. While the adjusting mechanism may be provided on top of the driving member or a bottom portion of the container body, the former configuration of the adjusting mechanism leads to a pepper mill that has a simpler structure and that is easier to use.

U.S. Pat. No. 6,378,794 B1 discloses another conventional pepper mill that has a similar configuration to the abovementioned conventional pepper mill, and that includes an adjusting mechanism operable for changing the size of ground pepper particles. However, the abovementioned drawback that the output torque cannot be adjusted still remains.

EP Publication No. 2,052,655 A2 discloses a food cutting device that has a storage arranged in a housing and supplying goods to be milled. The food cutting device comprises a transmission provided between an actuator and a grinding mill. The transmission is configured as a planetary gear unit, so that rotation of the actuator results in a relatively large output torque to the grinding mill, such that a relatively effort-saving food-grinding operation can be conducted.

SUMMARY OF THE INVENTION

Therefore, the object of the present invention is to provide a pepper mill that is adjustable to produce ground pepper of different sizes, and that provides an effort-saving pepper-grinding operation.

Accordingly, a pepper mill of the present invention comprises a container body surrounding an axis, a driving member, a grinding unit, a planetary gear mechanism, and an adjusting unit. The driving member is coupled rotatably to the container body, and cooperates with the container body to define a receiving space for receiving peppercorns. The grinding unit includes a coupling shaft, a first grinding seat, and a second grinding seat. The coupling shaft extends rotatably in the receiving space along the axis, is movable in the receiving space along the axis, and has a threaded segment extending outwardly of the driving member. The first grinding seat is mounted to the container body and has a first grinding surface surrounding the coupling shaft. The second grinding seat is coupled co-rotatably to the coupling shaft and has a second grinding surface cooperating with the first grinding surface to define a grinding space therebetween. The first and second grinding surfaces are configured such that the size of the grinding space is adjusted when the coupling shaft and the second grinding seat move along the axis relative to the first grinding seat. The planetary gear mechanism is disposed in the receiving space, and includes a driving gear unit coupled co-rotatably to the driving member, and a driven gear unit coupled co-rotatably to the coupling shaft of the grinding unit and driven rotatably by the driving gear unit to drive rotation of the coupling shaft. The adjusting unit includes an adjusting component connected threadedly to the threaded segment of the coupling shaft, and operable to drive the coupling shaft and the second grinding seat to move along the axis relative to the first grinding seat so as to adjust the size of the grinding space.

BRIEF DESCRIPTION OF THE DRAWINGS

Other features and advantages of the present invention will become apparent in the following detailed description of the preferred embodiments with reference to the accompanying drawings, of which:

FIG. 3 is a cross-sectional view of the first preferred embodiment;

DETAILED DESCRIPTION OF THE PREFERRED EMBODIMENTS

Before the present invention is described in greater detail, it should be noted that like elements are denoted by the same reference numerals throughout the disclosure.

Figure 1:
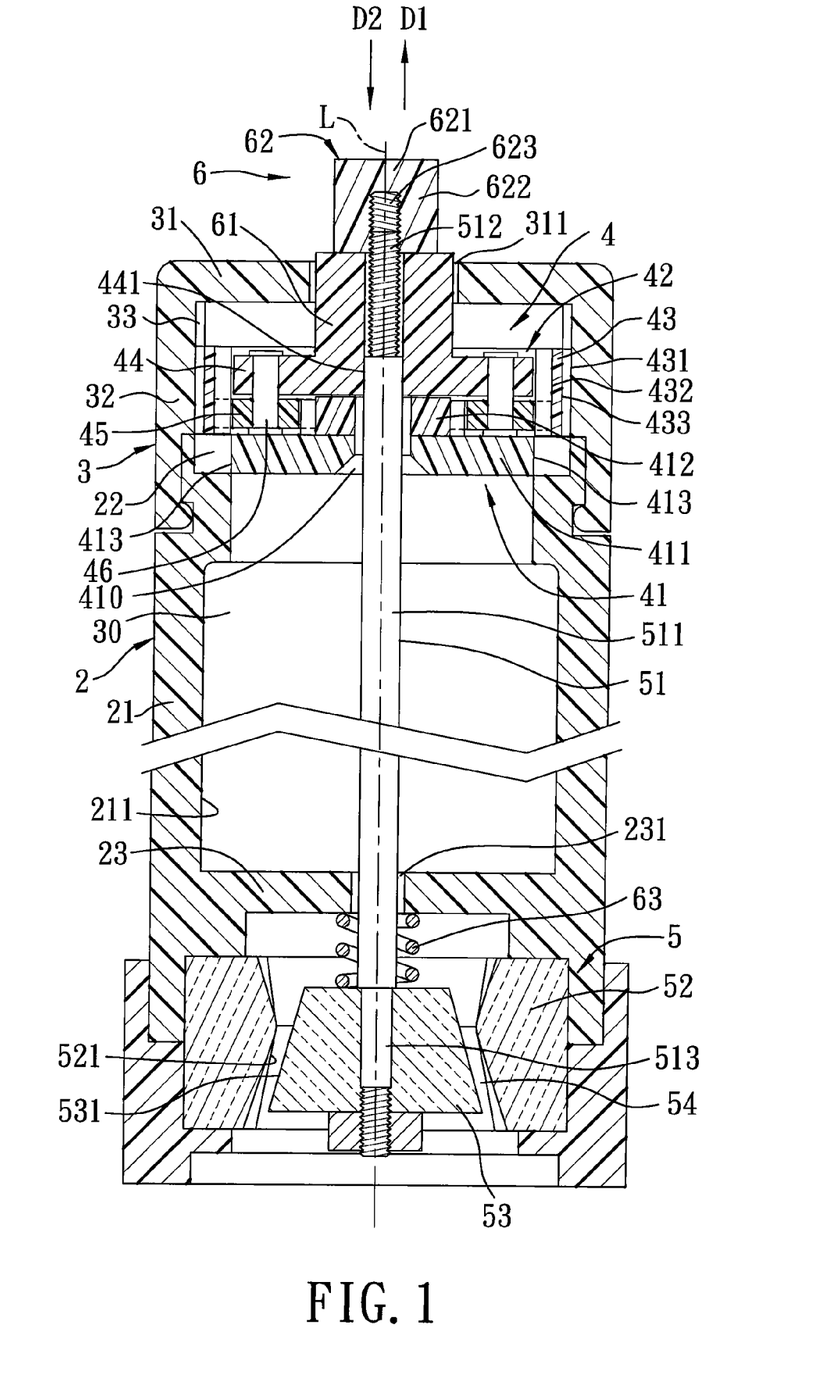
FIG. 1 is a fragmentary sectional view of a first preferred embodiment of a pepper mill according to the invention, illustrating a second grinding seat at a first position.
Figure 2:
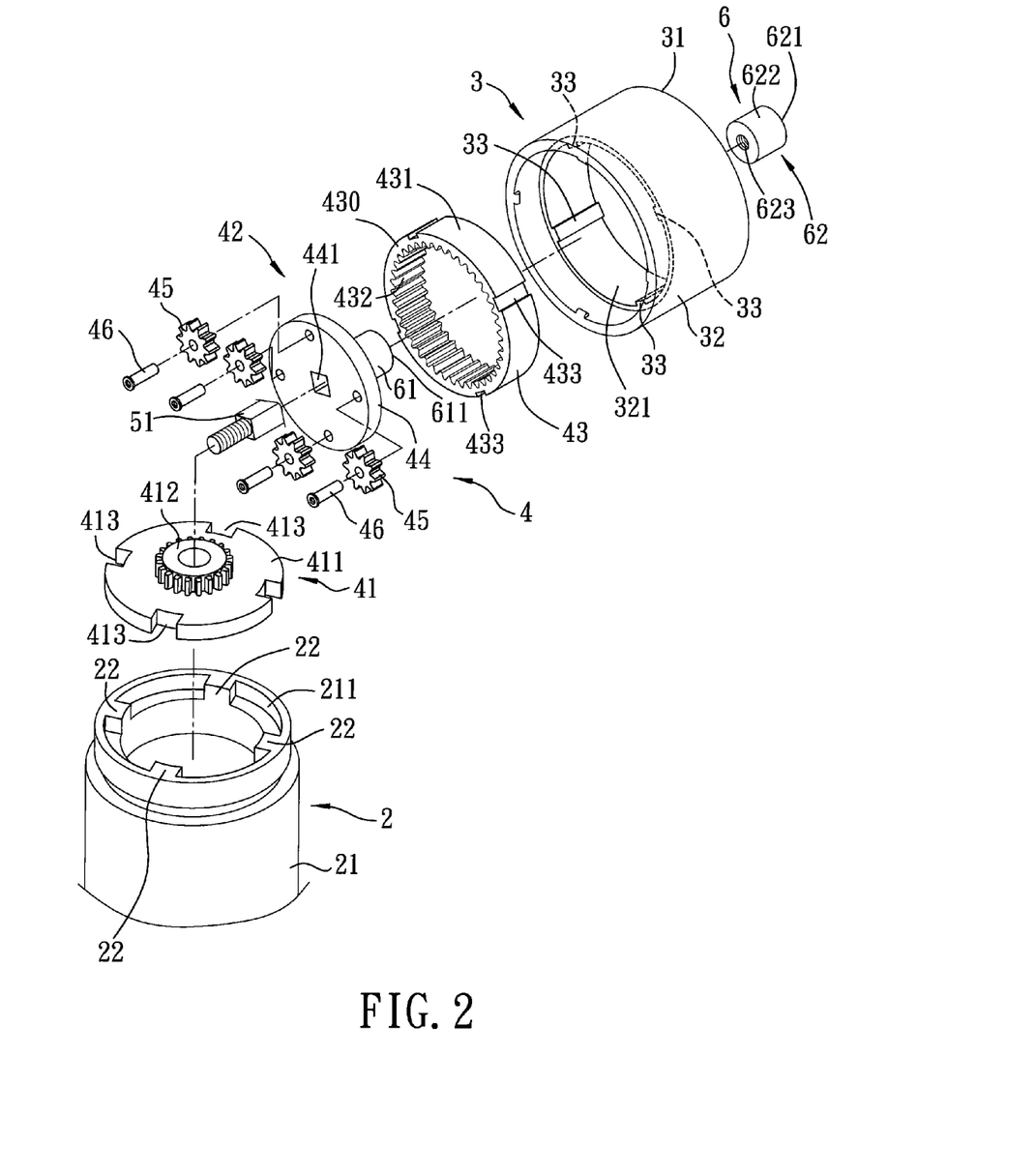
FIG. 2 is a fragmentary exploded perspective view of the first preferred embodiment.

As shown in FIGS. 1 to 3, the first preferred embodiment of a pepper mill according to the present invention comprises a Container body 2, a driving member 3 coupled rotatably to the container body 2 and cooperating with the container body 2 to define a receiving space 30 for receiving peppercorns, a grinding unit 5, a planetary gear mechanism 4, and an adjusting unit 6.

In this embodiment, the container body 2 includes a container wall 21 surrounding an axis (L) and having an inner surrounding surface 211 that confronts the receiving space 30, and a plurality of angularly spaced-apart engaging blocks 22 projecting radially and inwardly from an upper end of the inner surrounding surface 211 of the container wall 21. The container body 2 further includes a blocking wall 23 extending radially and inwardly from the inner surrounding surface 211 of the container wall 21, and formed with a shaft hole 231.

The driving member 3 has a reference wall 31 disposed over the container body 2 and formed with a shaft hole 311, and a side wall 32 extending from a periphery of the reference wall 31, coupled rotatably to the container wall 21 of the container body 2, and having an inner surface 321. In this embodiment, the driving member 3 cooperates with the container wall 21 and the blocking wall 23 of the container body 2 to define the receiving space 30. The driving member 3 further has a plurality of angularly spaced-apart protrusions 33 projecting radially and inwardly from the inner surface 321 of the side wall 32.

Figure 4:
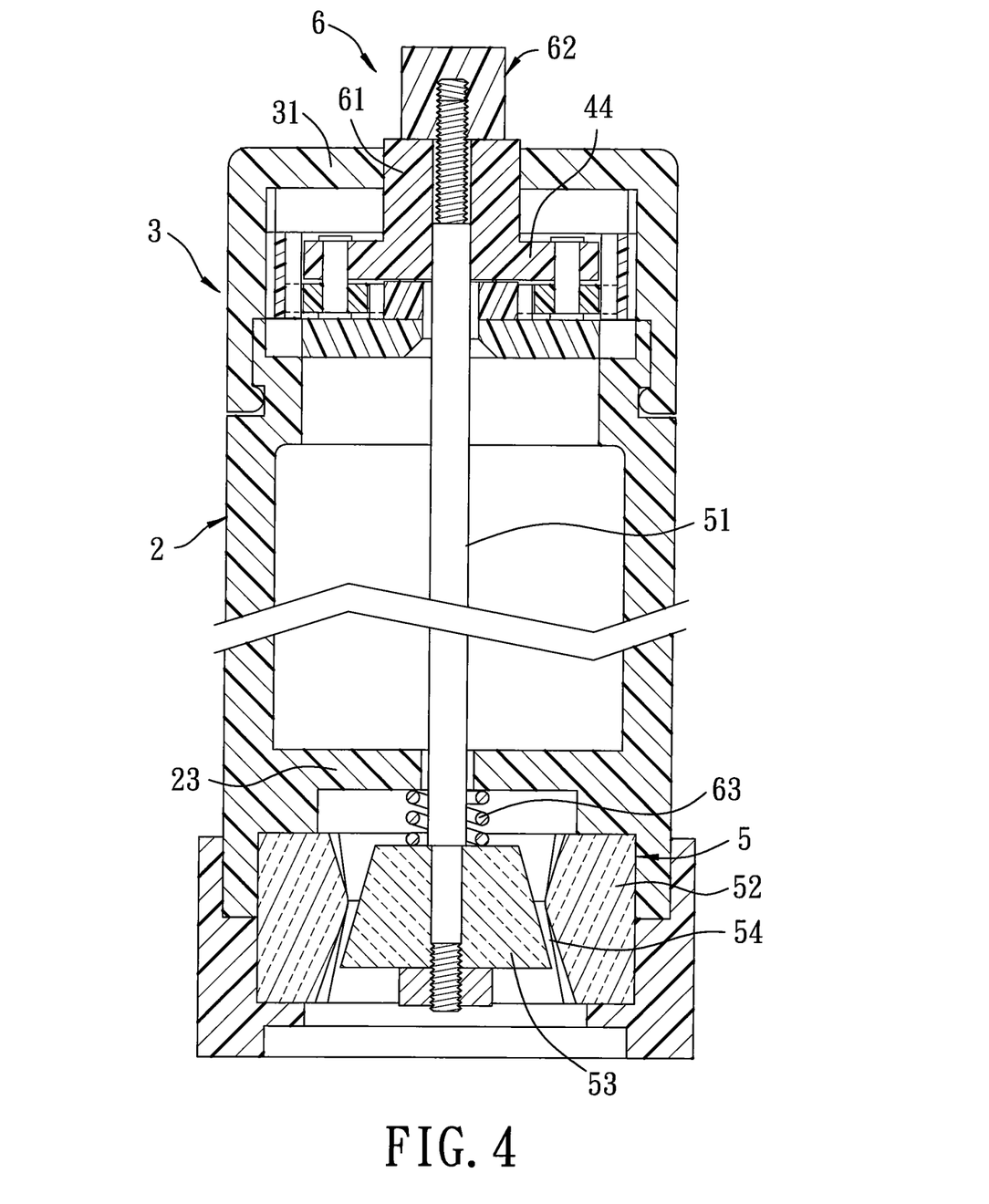
FIG. 4 is a view similar to FIG. 1, but illustrating the second grinding seat at a second position.

The grinding unit 5 includes a coupling shaft 51, a first grinding seat 52, and a second grinding seat 53. The coupling shaft 51 extends rotatably in the receiving space 30 along the axis (L), and is movable in the receiving space 30 along the axis (L). The coupling shaft 51 has a main segment 511 with a square cross-section, a threaded segment 512 extending upwardly from a top end of the main segment 511 and outwardly of the reference wall 31 of the driving member 3 through the shaft hole 311 of the reference wall 31 and having a circular cross-section, and a coupling segment 513 extending downwardly from a bottom end of the main segment 511 and outwardly of the blocking wall 23 of the container body 2 through the shaft hole 231 of the blocking wall 23. The first grinding seat 52 is mounted to the inner surrounding surface 211 of the container wall 21, is disposed under the blocking wall 23, and has a first grinding surface 521 surrounding the coupling segment 513 of the coupling shaft 51. The second grinding seat 53 is coupled co-rotatably to the coupling segment 513 of the coupling shaft 51, and has a second grinding surface 531 cooperating with the first grinding surface 521 of the first grinding seat 52 to define a grinding space 54 that is in spatial communication with the shaft hole 231 of the blocking wall 23 and the receiving space 30. The first and second grinding surfaces 521, 531 are configured as inclined grinding surfaces. The second grinding seat 53 is movable together with the coupling shaft 51 relative to the first grinding seat 52 along the axis (L) between a first position (see FIG. 1), where the second grinding seat 53 is distal from the blocking wall 23, and a second position (see FIG. 4), where the second grinding seat 53 is proximate to the blocking wall 23.

In this embodiment, the planetary gear mechanism 4 is disposed in the receiving space 30, and includes a ring gear 43, a sun gear unit 41, and a planet gear unit 42. In this embodiment, the ring gear 43 serves as a driving gear and is coupled co-rotatably to the driving member 3. The ring gear 43 has a ring body 430 having an external surface 431 that confronts the inner surface 321 of the side wall 32 of the driving member 3, and that is formed with a plurality of angularly spaced-apart grooves 433 engaging respectively the protrusions 33 of the driving member 3, such that the ring gear 43 is connected non-rotatably to the driving member 3. The ring body 430 further has an internal gear surface 432 disposed radially opposite to the external surface 431. In this embodiment, the sun gear unit 41 includes a coupling wall 411 having a shaft hole 410 that is formed at the center thereof, and a plurality of angularly spaced-apart notches 413 that are formed at a periphery of the coupling wall 411, and that engage respectively the engaging blocks 22 of the container body 2, such that the coupling wall 411 is coupled non-rotatably to the container body 2. The sun gear unit 41 further includes a sun gear 412 that is mounted fixedly at the center of a top surface of the coupling wall 411, and that is surrounded by the ring gear 43. In this embodiment, the planet gear unit 42 serves as a driven gear unit, and includes a carrier 44 disposed above the sun gear unit 41 and formed with a square coupling hole 441, four angularly spaced-apart planet gears 45 located under the carrier 44 and disposed between and meshing with the internal gear surface 432 and the sun gear 412, and four pin axles 46 connecting rotatably and respectively the planet gears 45 to the carrier 44. The main segment 511 of the coupling shaft 51 has a top portion extending rotatably through the shaft hole 410 of the coupling wall 411 of the sun gear unit 41, and extending fittingly through the square coupling hole 441 of the carrier 44 so as to be coupled slidably and co-rotatably to the carrier 44.

The adjusting unit 6 includes an abutment member 61 extending upwardly from the carrier 44 of the planet gear unit 42 and extending outwardly of the reference wall 31 of the driving member 3 through the shaft hole 311 of the reference wall 31. The adjusting unit 6 further includes an adjusting component 62 having a top wall 621 that is disposed over the reference wall 31 of the driving member 3, and a surrounding wall 622 that extends downwardly from a periphery of the top wall 621, that abuts rotatably against a top end 611 of the abutment member 61, and that is formed with an internal screw thread 623. The threaded segment 512 of the coupling shaft 51 extends through the abutment member 61 and engages threadedly the internal screw thread 623. The adjusting unit 6 further includes a resilient member 63 having opposite ends abutting resiliently against the blocking wall 23 and the second grinding seat 53.

In use, the driving member 3 is rotated relative to the container body 2, and the ring gear 43 is also rotated together with the driving member 3 due to the engagement between the protrusions 33 of the driving member 3 and the grooves 433 in the ring gear 43. Since the planet gears 45 mesh with the ring gear 43 and the sun gear 412, the planet gears 45 are driven by the ring gear 43 to rotate respectively on the pin axles 46 and to rotate about the axis (L), thereby driving the carrier 44 and the coupling shaft 51 to rotate about the axis (L). As a result, the second grinding seat 53 is driven to rotate together with the coupling shaft 51 relative to the first grinding seat 52, so that peppercorns advanced from the receiving space 30 into the grinding space 54 are ground into ground pepper.

To sum up, the rotation of the coupling shaft 51 is driven by the operation of the planetary gear mechanism 4 instead of being driven directly by the driving member 3. Under the configuration of the planetary gear mechanism 4, the coupling shaft 51 is rotated at a rotational speed less than that of the ring gear 43, while torque of the coupling shaft 51 is increased, thereby resulting in an effort-saving pepper-grinding operation.

The size of ground pepper particles can be adjusted through operation of the adjusting unit 6. By virtue of the threaded engagement between the threaded segment 512 of the coupling shaft 51 and the internal screw thread 623 of the adjusting component 62, the adjusting component 62 can be rotated to drive the coupling shaft 51 and the second grinding seat 53 to move in a first direction (D1) (see FIG. 1) along the axis (L) relative to the first grinding seat 52 from the first position to the second position, such that the grinding space 54 is decreased, and the size of the ground pepper particles is decreased as well. On the other hand, when the adjusting component 62 is rotated reversely, the coupling shaft 51 and the second grinding seat 53 are driven and at the same time, biased resiliently by the resilient member 63, to move in a second direction (D2) (see FIG. 1) opposite to the first direction (D1) along the axis (L) relative to the first grinding seat 52 from the second position back to the first position, such that the grinding space 54 is increased, thereby increasing the size of the ground pepper particles.

It should be noted that, if the adjusting component 62 is connected co-rotatably to the driving member 3, the adjusting component 62 will be driven to rotate at the same rotational speed as the driving member 3 during the rotation of the driving member 3. Since the rotational speed of the driving member 3 is greater than that of the coupling shaft 51 during the pepper-grinding operation, the adjusting component 62 will be rotated faster than the coupling shaft 51, and eventually will be tightened to the threaded segment 512 of the coupling shaft 51 such that no further adjusting operation can be conducted. In this embodiment, since the adjusting component 62 abuts against the abutment member 61 and is separated from the driving member 3, the abovementioned drawback can be avoided.

Figure 5:
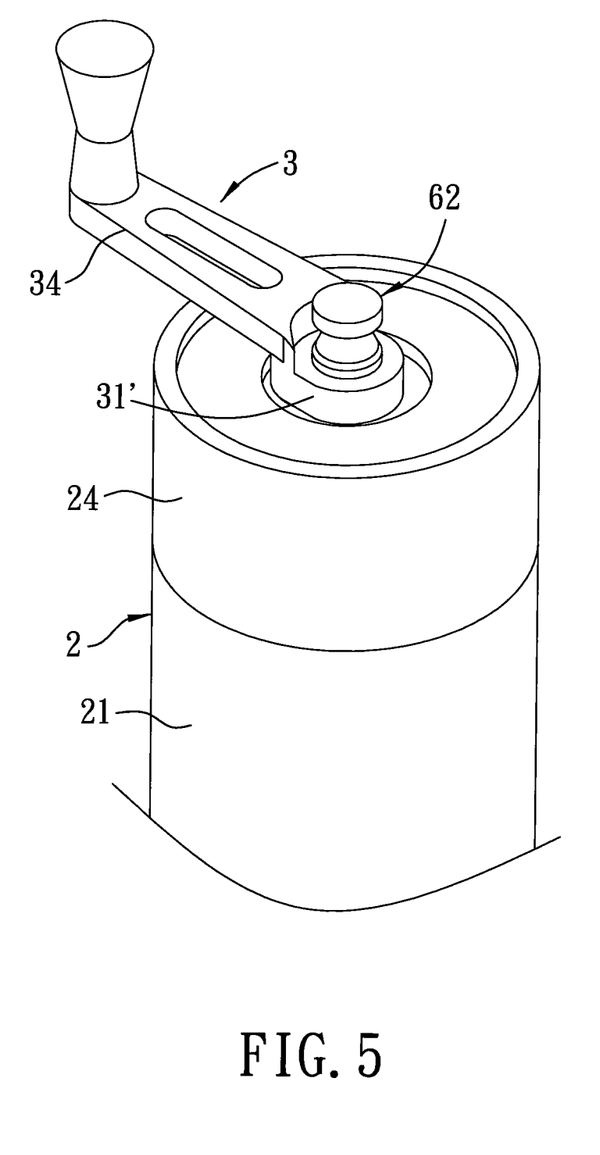
FIG. 5 is a fragmentary perspective view of a second preferred embodiment of the pepper mill according to the invention.
Figure 6:
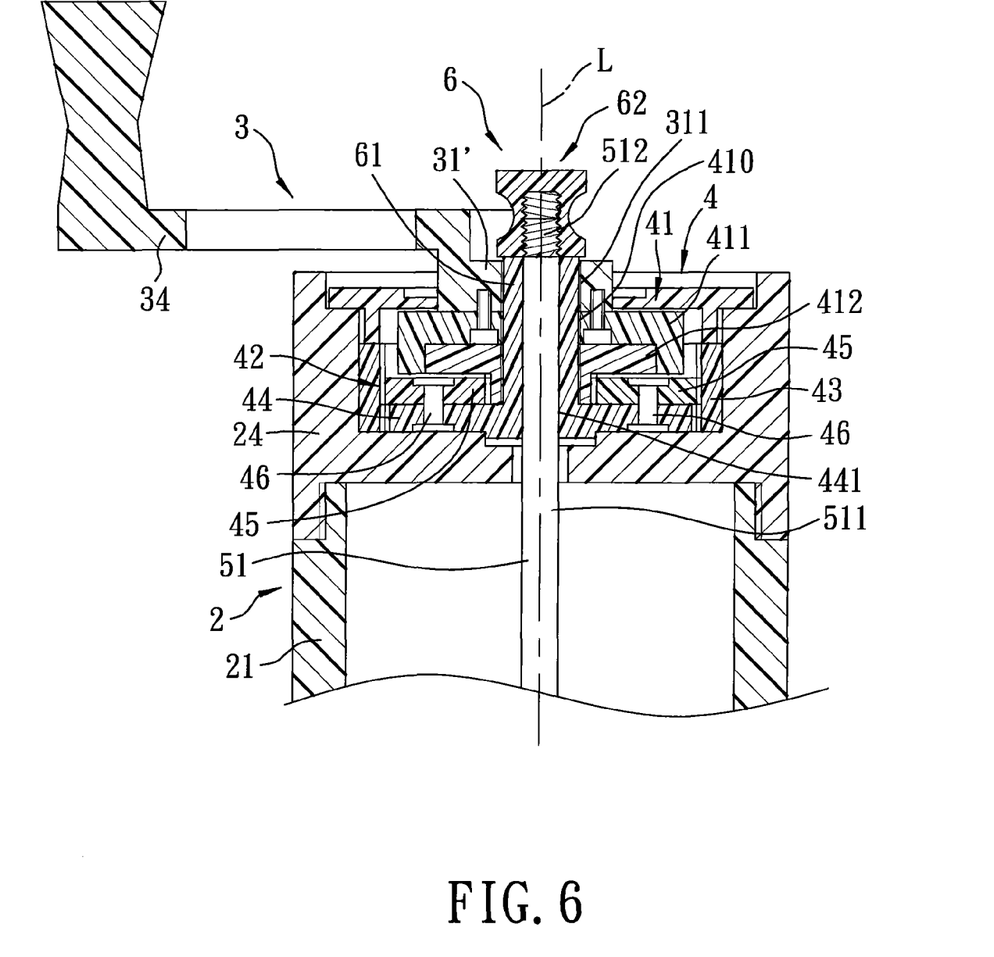
FIG. 6 is a fragmentary sectional view of the second preferred embodiment.

Referring to FIGS. 5 and 6, the second preferred embodiment of the pepper mill according to the present invention has a structure similar to that of the first embodiment. The main difference between this embodiment and the previous embodiment resides in the following.

In the second preferred embodiment, the container body 2 further includes a securing end wall 24 secured to a top end of the container wall 21.

The driving member 3 in this embodiment has a reference wall 31' and an actuating arm 34. The reference wall 31' is disposed between the securing end wall 24 of the container body 2 and the adjusting component 62 of the adjusting unit 6, and is formed with a shaft hole 311. The actuating arm 34 extends horizontally from a top end of the reference wall 31' and has a bent end portion distal from the reference wall 31' and bent upwardly.

In this embodiment, the sun gear unit 41 of the planetary gear mechanism 4 serves as the driving gear unit, and includes a coupling wall 411 that is mounted co-rotatably to a bottom surface of the reference wall 31' of the driving member 3, and that is formed with a shaft hole 410, and a sun gear 412 coupled co-rotatably to a bottom surface of the coupling wall 411. The ring gear 43 of the planetary gear mechanism 4 is coupled non-rotatably to an inner surface of the securing end wall 24 of the container body 2, and surrounds the sun gear unit 41. The planet gear unit 42 of the planetary gear mechanism 4 serves as the driven gear unit, and includes a carrier 44 formed with a coupling hole 441, a plurality of planet gears 45, and a plurality of pin axles 46 connecting rotatably and respectively the planet gears 45 to a top surface of the carrier 44.

The abutment member 61 of the adjusting unit 6 extends upwardly from the carrier 44, rotatably through the shaft hole 410 of the coupling wall 411 of the sun gear unit 41 and the shaft hole 311 of the reference wall 31' of the driving member 3, and outwardly of the reference wall 31' of the driving member 3. The main segment 511 of the coupling shaft 51 extends through the abutment member 61 and the coupling hole 441 of the carrier 44 so as to be coupled slidably and co-rotatably to the carrier 44. The adjusting component 62 engages threadedly the threaded segment 512 of the coupling shaft 51 and abuts rotatably against a top end of the abutment member 61.

In use, the actuating arm 34 is operable for rotating the reference wall 31' of the driving member 3 about the axis (L) relative to the container body 2, thereby rotating the sun gear unit 41. The rotation of the sun gear unit 41 drives the planet gears 45 to rotate respectively on the pin axles 46 and to rotate about the axis (L), thereby driving the carrier 44 and the coupling shaft 51 to rotate about the axis (L) for conducting the pepper-grinding operation. The second preferred embodiment has the same advantages as those of the first preferred embodiment.

Figure 7:
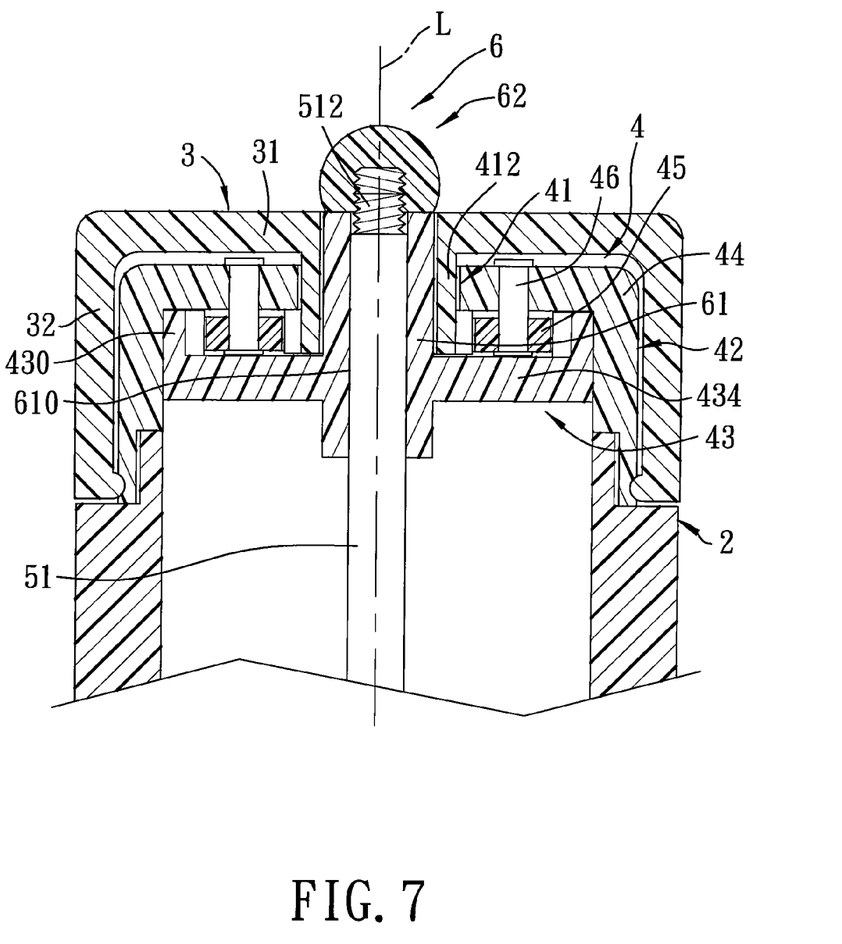
FIG. 7 is a fragmentary sectional view of a third preferred embodiment of the pepper mill according to the invention.

As shown in FIG. 7, the third preferred embodiment of the pepper mill according to the present invention has a structure similar to that of the first preferred embodiment. The main difference between this embodiment and the first preferred embodiment resides in the following.

In this embodiment, the sun gear unit 41 of the planetary gear mechanism 4 serves as the driving gear unit, and includes a sun gear 412 that is coupled co-rotatably to a bottom side of the reference wall 31 of the driving member 3. The ring gear 43 of the planetary gear mechanism 4 serves as the driven gear unit, and has a coupling plate 434 disposed under the sun gear 412, and a ring body 430 extending upwardly from a periphery of the coupling plate 434 and surrounding the sun gear 412. The planet gear unit 42 of the planetary gear mechanism 4 includes a carrier 44 coupled non-rotatably to a top end of the container body 2, a plurality of planet gears 45, and a plurality of pin axles 46 connecting rotatably and respectively the planet gears 45 to the carrier 44. The planet gears 45 are disposed between and mesh with gear teeth on the ring body 430 of the ring gear 43 and the sun gear 412. The abutment member 61 of the adjusting unit 6 extends upwardly from the coupling plate 434 of the ring gear 43, extends through the sun gear 412 and the reference wall 31 of the driving member 3 along the axis (L), and is formed with a square through hole 610 extending therethrough along the axis (L). The coupling shaft 51 extends fittingly through the through hole 610 so as to be coupled slidably and co-rotatably to the ring gear 43, and has a threaded segment 512 extending outwardly from the reference wall 31 of the driving member 3. The adjusting component 62 of the adjusting unit 6 engages threadedly the threaded segment 512 of the coupling shaft 51, and that abuts rotatably against a top end of the abutment member 61.

In use, the driving member 3 and the sun gear unit 41 are rotated about the axis (L) relative to the container body 2. The rotation of the sun gear unit 41 drives the planet gears 45 to rotate respectively on the pin axles 46 and to rotate about the axis (L), thereby driving the ring gear 43 and the coupling shaft 51 to rotate about the axis (L) for conducting the pepper-grinding operation. The third preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A pepper mill comprising:
   a container body surrounding an axis;
   a driving member coupled rotatably to said container body, and cooperating with said container body to define a receiving space for receiving peppercorns;
   a grinding unit including
      a coupling shaft that extends rotatably in said receiving space along the axis, that is movable in said receiving space along the axis, and that has a threaded segment extending outwardly of said driving member,
      a first grinding seat that is mounted to said container body and that has a first grinding surface surrounding said coupling shaft, and
      a second grinding seat that is coupled co-rotatably to said coupling shaft and that has a second grinding surface cooperating with said first grinding surface to define a grinding space therebetween,
   said first and second grinding surfaces being configured such that the size of said grinding space is adjusted when said coupling shaft and said second grinding seat move along the axis relative to said first grinding seat;
a planetary gear mechanism disposed in said receiving space, and including a driving gear unit coupled co-rotatably to said driving member, and a driven gear unit coupled co-rotatably to said coupling shaft of said grinding unit and driven rotatably by said driving gear unit to drive rotation of said coupling shaft; and
an adjusting unit including an adjusting component that is connected threadedly to said threaded segment of said coupling shaft, and that is operable to drive said coupling shaft and said second grinding seat to move along the axis relative to said first grinding seat so as to adjust the size of said grinding space; and
wherein said planetary gear mechanism includes:
a ring gear serving as said driving gear unit,
a sun gear unit coupled non-rotatably to said container body and including a sun gear surrounded by said ring gear, and
a planet gear unit serving as said driven gear unit and including a carrier, a plurality of planet gears, and a plurality of pin axles that connect rotatably and respectively said planet gears to said carrier,
said planet gears being disposed between and meshing with said ring gear and said sun gear,
said coupling shaft extending rotatably through said sun gear unit and being coupled slidably and co-rotatably to said carrier,
said driving member and said ring gear being rotatable relative to said container body so as to drive said planet gears to rotate respectively on said pin axles, and drive said carrier and said coupling shaft to rotate about the axis.

2. The pepper mill as claimed in claim 1, wherein:
said container body includes a container wall surrounding the axis and having an inner surrounding surface that confronts said receiving space, and an engaging block projecting radially and inwardly from said inner surrounding surface of said container wall; and
said sun gear unit further includes a coupling wall formed with a notch that engages said engaging block, said sun gear being mounted fixedly on said coupling wall.

3. The pepper mill as claimed in claim 2, wherein:
said driving member has
a reference wall disposed over said container body and formed with a shaft hole, and
a side wall extending from a periphery of said reference wall, coupled rotatably to said container body, and having an inner surface;
said threaded segment of said coupling shaft of said grinding unit extends outwardly of said reference wall of said driving member through said shaft hole; and
said ring gear has a ring body having an external surface that confronts and that is connected non-rotatably to said inner surface of said side wall of said driving member, and an internal gear surface that is radially opposite to said external surface and that meshes with said planet gears.

4. The pepper mill as claimed in claim 3, wherein said adjusting component has a top wall disposed over said reference wall of said driving member, and a surrounding wall extending downwardly from a periphery of said top wall and formed with an internal screw thread, said threaded segment of said coupling shaft engaging threadedly said internal screw thread.

5. The pepper mill as claimed in claim 4, wherein said adjusting unit further includes an abutment member extending from said carrier of said planet gear unit and outwardly of said reference wall of said driving member, said coupling shaft extending through said abutment member, said adjusting component abutting rotatably against said abutment member.

6. The pepper mill as claimed in claim 1, wherein:
said container body includes a container wall surrounding the axis and having an inner surrounding surface that confronts said receiving space, and a blocking wall extending radially and inwardly from said inner surrounding surface of said container wall and cooperating with said container wall and said driving member to define said receiving space;
said second grinding seat being movable together with said coupling shaft of said grinding unit along the axis between a first position, where said second grinding seat is more distal from said blocking wall, and a second position, where said second grinding seat is more proximate to said blocking wall; and
said adjusting unit further includes a resilient member having opposite ends abutting resiliently against said blocking wall and said second grinding seat for biasing said second grinding seat toward the first position.

7. The pepper mill as claimed in claim 1, wherein said first and second grinding surfaces are configured such that the size of said grinding space is decreased when said coupling shaft and said second grinding seat move along the axis in a first direction relative to said first grinding seat, and is increased when said coupling shaft and said second grinding seat move along the axis in a second direction opposite to the first direction relative to said first grinding seat.

8. The pepper mill as claimed in claim 7, wherein said first and second grinding surfaces are configured as inclined grinding surfaces.

* * * * *